United States Patent
Hirohashi et al.

[15] 3,676,460
[45] July 11, 1972

[54] BENZOXAZEPINE DERIVATIVES

[72] Inventors: Toshiyuki Hirohashi, Ashiya; Takahiro Izumi, Takarazuka; Hisao Yamamoto, Nishinomiya, all of Japan

[73] Assignee: Sumitomo Chemical Company, Ltd., Osaka, Japan

[22] Filed: March 24, 1970

[21] Appl. No.: 22,388

[30] Foreign Application Priority Data

March 28, 1969 Japan.................................44/24232
March 31, 1969 Japan.................................44/24974
May 6, 1969 Japan.................................44/34964

[52] U.S. Cl. ........................260/333, 424/278, 260/558 R
[51] Int. Cl. .........................................................C07d 87/54
[58] Field of Search...................................................260/333

[56] References Cited

UNITED STATES PATENTS 3,478,056  11/1969  Schmutz et al. ...........................260/333

OTHER PUBLICATIONS

Current Abstracts of Chemistry, Vol. 36, Issue 323, 1970, 128456, abstracting J. Pharm. Sci. 58(12) 1,460–3 (1969)
Houben-Weyl, Methoden der Organischen Chemie, Vol. 6/4 (1966) pp. 568

*Primary Examiner*—Norma S. Milestone
*Attorney*—Stevens, Davis, Miller & Mosher

[57] ABSTRACT

Novel 2,3-dihydro-1,4-benzoxazepine or 2,3,4,5-tetrahydro-1,4-benzoxazepine derivatives, which have strong central nervous system activity, of the formula:

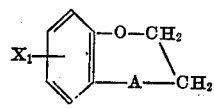

$X_1$ is hydrogen, halogen, $C^1 - C^3$ alkyl or $C^1 - C^3$ alkoxy and A is a group of the formula:

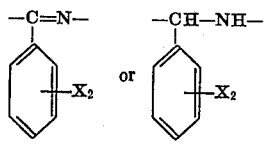

wherein $X_2$ is hydrogen, halogen, $C^1 - C^3$ alkyl or $C^1 - C^3$ alkoxy. These compounds are produced by contacting a phenoxyethlamine derivative of the formula:

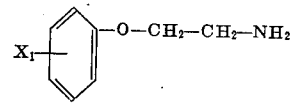

with a benzoylhalide derivative of the formula:

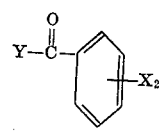

to yield an N-benzoyl phenoxyethlamine derivative of the formula:

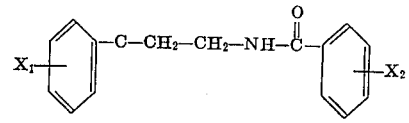

and contacting the obtained N-benzoyl phenoxyethylamine derivative with a suitable dehydrating agent to yield a 2,3-dihydro-1,4-benzoxazepine derivative of the formula:

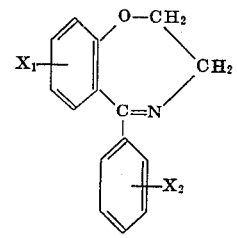

and further, if necessary, reducing the resultant 2,3-dihydro-1,4-benzoxazepine derivative to yield a 2,3,4,5-tetrahydro-1,4-benzoxazepine derivative of the formula:

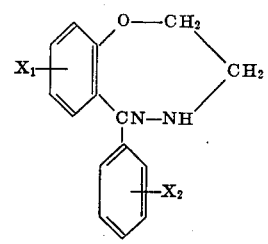

in the above formulas $X_1$ and $X_2$ being as defined above, and Y being halogen.

5 Claims, No Drawings

BENZOXAZEPINE DERIVATIVES

This invention relates to novel fused heterocyclic ring compounds, a use and a process for the production of them. More particularly, this invention pertains to novel 2,3-dihydro-1,4-benzoxazepines and their reduction products and a pharmaceutical use and a process for the production of them.

The present inventors have found that dehydration of an N-benzoyl phenoxyethylamine derivatives gives novel fused heterocyclic ring compounds which have strong central nervous system activity and that novel reduction products of the fused heterocyclic ring compounds have also strong central nervous system activity.

Accordingly, an object of the present invention is to provide novel fused heterocyclic ring compounds having strong central nervous system activity. Another object of the present invention is to provide a process for the production of such novel fused heterocyclic ring compounds.

A further object of the present invention is to provide a pharmaceutical use of such novel fused heterocyclic ring compounds.

Other objects and merits of the present invention will be apparent from the description that follows.

In order to accomplish these objects, the present invention provides novel fused heterocyclic ring compounds of the formula:

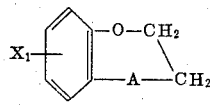
(I)

wherein $X_1$ is hydrogen, halogen, $C^1 - C^3$ alkyl (i.e. methyl, ethyl and n- or iso-propyl) or $C^1 - C^3$ alkoxy (i.e. methoxy, ethoxy and n- or iso-propoxy and A is a group of the formula:

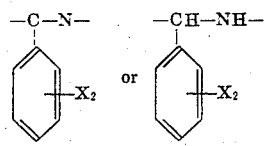

wherein $X_2$ is hydrogen, halogen, $C^1 - C^3$ alkyl (i.e. methyl, ethyl and n- or iso-propyl) or $C^1 - C^3$ alkoxy (i.e. methoxy, ethoxy and n- or iso-propoxy).

The fused heterocyclic ring compounds of the formula (I) are produced by dehydrating a novel N-benzoyl phenoxyethylamine derivative of the formula:

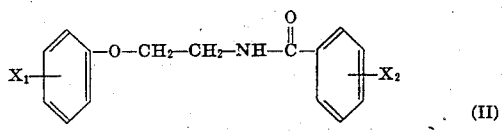
(II)

wherein $X_1$ and $X_2$ have the same meanings as defined above, to yield a 2,3-dihydro-1,4-benzoxazepine derivative of the formula:

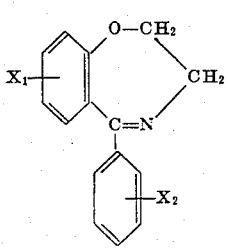
(III)

wherein $X_1$ and $X_2$ have the same meanings as defined above, and further, if necessrry, reducing the obtained 2,3-dihydro-1,4-benzoxazepine derivative to yield a 2,3,4,5-tetrahydro-1,4-benzoxazepine derivative of the formula:

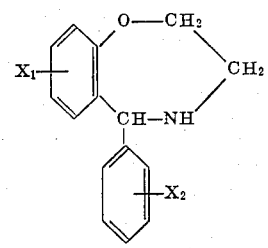
(IV)

wherein $X_1$ and $X_2$ have the same meanings as defined above.

N-Benzoyl phenoxyethylamine derivatives which are used as the starting material are produced by reacting a phenoxyethylamine derivative of the formula:

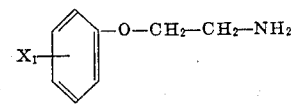
(V)

wherein $X_1$ has the same meanings as defined above, with a benzoylhalide derivative of the formula:

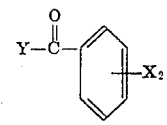
(VI)

wherein $X_2$ has the same meanings as defined above and Y is halogen (e.g. chlorine, bromine, indine), according to conventional methods which can produce acid amide compounds.

For example the phenoxyethylamine derivative of the formula (V) is contacted with the benzoylhalide derivative of the formula (VI) in the presence of a reaction medium. Examples of the reaction medium include inert organic solvents such as benzene, toluene, xylene, chloroform or ethyl ether and water. In the present invention it is possible to carry out the reaction in the presence of a basic agent as a dehydrogen halide agent, examples of which include trialkylamines such as triethylamine, pyridine, sodium hydroxide and potassium hydroxide. The reaction is carried out, in general, under ice-cooling, however if necessary, at a temperature of boiling point of the reaction medium.

The dehydration of the N-benzoyl phenoxyethylamine derivative of the formula (II) causes the production of the corresponding 2,3-dihydro-1,4-benzoxazepine derivatives of the formula (III). The dehydration is carried out in the presence of an appropriate dehydrating agent at an elevated temperature, preferably 35° – 250° C. Examples of the dehydrating agent include phosphorus pentoxide, phosphorus oxychloride, concentrated phosphoric acid and the like or a mixture thereof. The dehydrating agent is used in an amount of 1 – 100 mole, preferably 5 – 30 mole, per mole of the N-benzoyl phenoxyethylamine derivative. The reaction is carried out in the absence or presence of a usual inert organic solvent such as toluene, xylene, tetraline, nitrobenzene, chloroform and the like.

The 2,3-dihydro-1,4-benzoxazepine derivatives of the formula (III) may be isolated in the form of an acid addition salt by treatment with an acid, e.g. a mineral acid such as hydrochloric, sulfuric, nitric, phosphoric or chromic acid, or an organic acid such as maleic, fumaric, succinic, formic or acetic acid.

According to the process of the present invention, there are produced such 2,3-dihydro-1,4-benzoxazepine derivatives and acid addition salts thereof as shown below.

7-Bromo-5-phenyl-2,3-dihydro-1,4-benzoxazepine
7-Fluoro-5-phenyl-2,3-dihydro-1,4-benzoxazepine
5-Phenyl-2,3-dihydro-1,4-benzoxazepine
5-(o-Fluorophenyl)-2,3-dihydro-1,4-benzoxazepine
7-Chloro-5-(o-fluorophenyl)-2,3-dihydro-1,4-benzoxazepine
7-Chloro-5-(o-chlorophenyl)-2,3-dihydro-1,4-benzoxazepine
7-Chloro-5-(o-bromophenyl)-2,3-dihydro-1,4-benzoxazepine 7-Chloro-5-(p-fluorophenyl)-2,3-dihydro-1,4-benzoxazepine
7-Chloro-5-(m-fluorophenyl)-2,3-dihydro-1,4-benzoxazepine
7-Methoxy-5-phenyl-2,3-dihydro-1,4-benzoxazepine
7-Methoxy-5-(o-fluorophenyl)-2,3-dihydro-1,4-benzoxazepine
7-Methoxy-5-(o-methoxyphenyl)-2,3-dihydro-1,4-benzoxazepine
7-Chloro-5-(o-methoxyphenyl)-2,3-dihydro-1,4-benzoxazepine
7-Methyl-5-(o-fluorophenyl)-2,3-dihydro-1,4-benzoxazepine
7-Chloro-5-phenyl-2,3-dihydro-1,4-benzoxazepine
7-Ethoxy-5-phenyl-2,3-dihydro-1,4-benzoxazepine
7-n-Propoxy-5-phenyl-2,3-dihydro-1,4-benzoxazepine
7-Ethyl-5-phenyl-2,3-dihydro-1,4-benzoxazepine
7-n-Propyl-5-phenyl-2,3-dihydro-1,4-benzoxazepine In the present invention, 2,3-dihydro-1,4-benzoxazepine derivatives of the formula (III) are, if necessary, reduced to yield corresponding 2,3,4,5-tetrahydro-1,4-benzoxazepine derivatives of the formula (IV) according to conventional reduction methods, for example, electrolytic reduction, reduction with alkali metals in alcohols, catalytic reduction using palladium-, nickel- or platinum-system catalysts, reduction using chromous acetate-alkali, or reduction using metal hydride complexes which include lithium aluminum hydride, boron hydride and their mixture with an acid such as aluminum chloride, forric chloride, boron trifluoride, hydrogen chloride or the like. In the case of the employment of lithium aluminum hydride, the reduction is carried out in an inert organic solvent, such as diethylether or tetrahydrofuran at a temperature ranging from about −5° to about 70° C. In the case of the employment of platinic oxide, the catalytic reduction is carried out in a usual inert organic solvent such as ethanol, methanol, dioxane or acetic acid, at a temperature between about 0° and about 100° C, under 1 to 10 atmospheric pressure.

The 2,3,4,5-tetrahydro-1,4-benzoxazepine derivatives of the formula (IV) may also be given in form of an acid addition salt by treating with a mineral acid or an organic acid.

According to the present method, there are produced such 2,3,4,5-tetrahydro-1,4-benzoxazepine derivatives and acid addition salts thereof as shown below.

7-Bromo-5-phenyl-2,3,4,5-tetrahydro-1,4-benzoxazepine
7-Fluoro-5-phenyl-2,3,4,5-tetrahydro-1,4-benzoxazepine
5-Phenyl-2,3,4,5-tetrahydro-1,4-benzoxazepine
5-(o-Fluorophenyl)-2,3,4,5-tetrahydro-1,4-benzoxazepine
7-Chloro-5-(o-fluorophenyl)-2,3,4,5-tetrahydro-1,4-benzoxazepine
7-Chloro-5-(o-chlorophenyl)-2,3,4,5-tetrahydro-1,4-benzoxazepine
7-Chloro-5-(o-bromophenyl)-2,3,4,5-tetrahydro-1,4-benzoxazepine
7-Chloro-5-(p-fluorophenyl)-2,3,4,5-tetrahydro-1,4-benzoxazepine
7-Chloro-5-(m-fluorophenyl)-2,3,4,5-tetrahydro-1,4-benzoxazepine
7-Methoxy-5-phenyl-2,3,4,5-tetrahydro-1,4-benzoxazepine
7-Methoxy-5-(o-fluorophenyl)-2,3,4,5-tetrahydro-1,4-benzoxazepine
7-Methoxy-5-(o-methoxyphenyl)-2,3,4,5-tetrahydro-1,4-benzoxazepine
7-Chloro-5-(o-methoxyphenyl)-2,3,4,5-tetrahydro-1,4-benzoxazepine
7-Methyl-5-(o-fluorophenyl)-2,3,4,5-tetrahydro-1,4-benzoxazepine
7-Chloro-5-phenyl-2,3,4,5-tetrahydro-1,4-benzoxazepine
7-Ethoxy-5-phenyl-2,3,4,5-tetrahydro-1,4-benzoxazepine
7-n-Propoxy-5-phenyl-2,3,4,5-tetrahydro-1,4-benzoxazepine
7-Ethyl-5-phenyl-2,3,4,5-tetrahydro-1,4-benzoxazepine
7-n-Propyl-5-phenyl-2,3,4,5-tetrahydro-1,4-benzoxazepine Fused heterocyclic ring compounds of the formula (I) and their acid addition salts have central nervous system (CNS) activity, for example, tranquillizing activity, hypnotic activity, muscle relaxant activity, etc. Said compounds are administrated either orally or parenterally from 2 to 3 times per day in average daily 5–10 mg/kg of body weight. Each of the pharmaceutically active compounds of this invention may be, e.g., incorporated, for oral administration, in a tablet as the sole active ingredient. Accordingly, in the present invention, pharmaceutical composition consisting of an effective amount of fused heterocyclic ring compound of the formula (I) and pharmaceutically acceptable carrier.

The following examples are given to illustrate the present invention but not to limit the scope of the present invention.

Example 1

Benzoyl chloride (1.5 g) was added dropwise to a solution of 1.72 g of p-chlorophenoxyethylamine in 20 ml of dry benzene with stirring at 0° C, and the solution was allowed to stand overnight at room temperature. Thereafter the mixture was refluxed for 2.5 hrs to give a white precipitate, which was filtered and washed with alcohol-water. And white crystals of N-benzoyl-2-(p-chlorophenoxy)-ethylamine having the m.p. of 127.0°–127.5° C were obtained.

N-Benzoyl-2-(p-chlorophenoxy)ethylamine (4.0 g) was added to a mixture of 20 g of phosphorus oxychloride and 10 g of phosphoruspentoxide in 100 ml of dry xylene, and then the mixture was heated under reflux for 6 hrs. The resultant mixture was poured into ice water, and the aqueous layer was separated and neutralized with aqueous ammonia, followed by extraction with dichloromethane. The extract was washed with water, dried and the solvent was evaporated. The obtained oily residue was chromatographed on silica gel, eluted with dichloro-methane, and crystallized with treatment of isopropylether-ethanol. And the resultant crystals were collected by filtration and dried to give white crystals of 7-chloro-5-phenyl-2,3-dihydro-1,4-benzoxazepine, m.p., 82°–83° C.

Example 2

Platinic oxide (0.20 g) was suspended in a solution of 0.6 g. of 7-chloro-5-phenyl-2,3-dihydro-1,4-benzoxazepine in 30 ml. of glacial acetic acid, and thereto was absorbed a hydrogen gas at room temperature under atmospheric pressure for 10 minutes. After the filtration and evaporation of the reaction mixture, the resulting residue was dissolved in ethanol, added with ethanolic hydrochloric acid to give crystals, which were recrystallized to give a white crystals of 7-chloro-5-phenyl-2,3,4,5-tetrahydro-1,4-benzoxazepine hydrochloride, m.p., 292.5° C (decomp).

What we claim is:

1. Fused heterocyclic ring compounds of the formula:

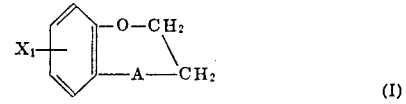

wherein $X_1$ is hydrogen, chlorine, bromine, fluorine, $C_1 - C_3$ alkyl or $C_1 - C_3$ alkoxy bonded at the 7-position of the benzoxazepine ring and A is a group of the formula:

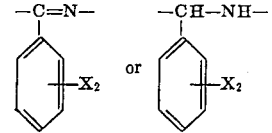

wherein $X_2$ is hydrogen, halogen, $C_1 - C_3$ alkyl or $C_1 - C_3$ alkoxy.

2. 2,3-Dihydro-1,4-benzoxazepine derivatives of the formula:

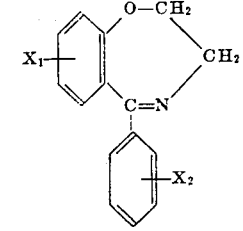

(III)

wherein $X_1$ is hydrogen, chlorine, bromine, fluorine, $C_1 - C_3$ alkyl or $C_1 - C_3$ alkoxy bonded at the 7-position of the benzoxazepine ring and $X_2$ is hydrogen, halogen, $C_1 - C_3$ alkyl or $C_1 - C_3$ alkoxy.

3. 2,3-Dihydro-1,4-benzoxazepine derivatives of the formula:

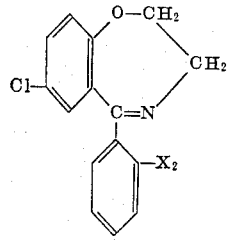

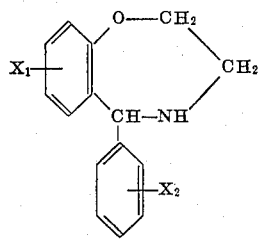

(IV)

wherein $X_1$ is hydrogen, chlorine, bromine, fluorine, $C_1 - C_3$ alkyl or $C_1 - C_3$ alkoxy bonded at the 7-position of the benzoxazepine ring and $X_2$ is halogen, hydrogen, $C_1 - C_3$ alkyl or $C_1 - C_3$ alkoxy.

5. 2,3,4,5-Tetrahydro-1,4-benzoxazepine derivatives of the formula:

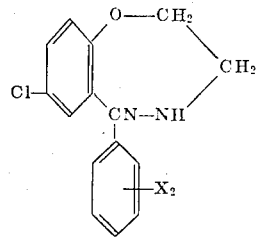

wherein $X_2$ is hydrogen or halogen.

* * * * *